United States Patent
Fox et al.

(10) Patent No.: US 7,386,845 B1
(45) Date of Patent: Jun. 10, 2008

(54) AUTOMATED COMPATIBILITY AND UPGRADE/DOWNGRADE KNOWLEDGE BASE

(75) Inventors: Adam Fox, Durham, NC (US); Anissa Mohler, Boulder Creek, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 238 days.

(21) Appl. No.: 11/089,753

(22) Filed: Mar. 24, 2005

(51) Int. Cl.
*G06F 9/44* (2006.01)

(52) U.S. Cl. .................. 717/170; 717/169; 717/175

(58) Field of Classification Search ........ 717/168–178; 707/102
See application file for complete search history.

(56) References Cited

U.S. PATENT DOCUMENTS

| | | | |
|---|---|---|---|
| 5,664,175 A * | 9/1997 | Jackson et al. | 707/7 |
| 5,784,563 A * | 7/1998 | Marshall et al. | 709/221 |
| 6,529,784 B1 * | 3/2003 | Cantos et al. | 700/79 |
| 6,678,639 B2 * | 1/2004 | Little et al. | 702/188 |
| 2004/0015946 A1 * | 1/2004 | Te'eni et al. | 717/169 |

* cited by examiner

*Primary Examiner*—Ted T Vo (57) ABSTRACT

An automated knowledge base includes a system identifier and a target version. The system identifier identifies a particular computer system and the target version identifies a target computer program to be installed on the computer system. Configuration information of the particular computer system is retrieved using the system identifier and a warning statement that describes a conflict between the configuration information and the target computer program is identified. A warning document that includes the identified warning statement is generated.

28 Claims, 6 Drawing Sheets

AUTOMATED COMPATIBILITY AND UPGRADE/DOWNGRADE KNOWLEDGE BASE

BACKGROUND OF THE INVENTION

1. Field of the Invention

The present invention relates generally an automated knowledge base. More particularly, the present invention relates to an automated knowledge base that provides information on and instructions for replacing one product with another, with particular applicability to upgrading and downgrading software.

2. Description of the Related Art

A knowledge base is a special kind of database for knowledge management. Generally, knowledge bases consist of explicit knowledge of an organization, including trouble shooting, articles, white papers, user manuals and others. Knowledge bases generally have a carefully designed classification structure, content format, and search engine.

In the software industry, knowledge bases include information on known bugs and incompatibilities of software products, as well as known supported and unsupported hardware. For complex software or for software distributed in a wide variety of environments and hardware configurations, the knowledge base can become quite lengthy. Add to this, the complexity of different versions of a specific software package, or conversions from or to different software vendors, and the knowledge base can become cumbersome even for an expert technician.

For example, in the process of upgrading an operating system, other complex software, or other component, it is necessary to determine the configuration of the system and to make sure that the target version of the software supports the current configuration and that the target version has no conflicts with other software currently installed. If any potential conflicts exist, then a procedure must be formulated to overcome each potential conflict prior to or during the installation of the new software version.

This procedure can be particularly difficult when upgrading a computer operating system where the target operating system must be capable of supporting all the current hardware, as well as have no conflicts with installed software currently on the system. If the hardware is old and no longer supported, then the hardware must be updated. It is also important to ensure that installed software can function with the new operating system. Since there exists a wide variety of computer architectures and system configurations, networking protocols, data storage systems, etc., and since any operating system can support only so many different architectures and so on, the list of incompatibilities can be quite large. Nevertheless, despite the complexities and potential risks of upgrading, there is often a very strong incentive to upgrade, e.g., so that new features and capabilities of newer versions can be leveraged.

A trained technician can refer to a knowledge base and/or other sources of information and formulate a procedure for upgrading a particular system depending on the various dependencies and compatibilities of the new and old software. However, due to the complexities described above, this can be time consuming and prone to errors even for an experienced technician.

There is therefore an unmet need for a system to provide some level of automation to the process of ensuring compatibility and hardware support of new software packages, as well as formulating a procedure for installing new software packages.

SUMMARY OF THE INVENTION

Broadly speaking, the present invention fills these needs by providing an automated knowledge base aiding in determining the advisability of and process for upgrading or downgrading a system.

It should be appreciated that the present invention can be implemented in numerous ways, including as a process, an apparatus, a system, a device, or a method. Several inventive embodiments of the present invention are described below.

In accordance with one aspect of the invention, a method for providing an automated knowledge base is provided. The automated knowledge base receives a system identifier and a target version. The system identifier identifies a particular computer system and the target version identifies a target computer program to be installed on the computer system. Configuration information of the particular computer system is retrieved using the system identifier and a warning statement that describes a conflict between the configuration information and the target computer program is identified. A warning document is generated comprising the identified warning statement.

In one embodiment, the method provides the automated knowledge base by retrieving information that identifies a configuration of a system from a database, the system having a current version of a component that is potentially upgradeable or downgradeable to a target version of the component. A list of rules is parsed, each of the rules testing for and identifying a condition of the system configuration. A warning list is generated, the warning list containing a warning for each condition identified by the rules wherein the warnings describe the conditions that may affect the upgrading or downgrading and explaining how the upgrading and downgrading is affected by the conditions. An advisor document is generated containing the warning list, and a plan document is generated containing a plan based on at least one of the warnings in the warning list.

In another embodiment, the method for providing the automated knowledge base includes identifying a current version and a target version for a system to be replaced, retrieving configuration information pertaining to the system, and retrieving a list of rules. Each rule in the list of rules comprises a Boolean expression, the Boolean expression testing for a condition of the system using the configuration information. The method further includes evaluating each Boolean expression of each of the rules in the list of rules and for each of the rules, adding a warning to an advisor document when the condition tested by the Boolean expression is present. The warning corresponds to the rule, the advisor document thereby providing advice regarding the replacing of the current version with the target version when the corresponding condition is present.

In accordance with another aspect of the present invention, a computer readable media having program instructions for implementing an automated knowledge base is provided. The computer readable media includes program instructions for retrieving a system identifier and a target version identifier, retrieving configuration information pertaining to a system, and retrieving a list of rules. Each rule in the list of rules comprises a Boolean expression that tests for a condition of the system using the configuration information and an associated warning. The computer readable media further includes program instructions for evaluating the Boolean expression for each rule thereby determining whether the condition tested by the Boolean expression is present in the system, program instructions for adding a warning associated with each of the rules in which the condition is determined to be present to a list of warnings to be displayed, and program instructions for generating a document containing the warnings in the list of warnings to be displayed.

In accordance with yet another aspect of the invention, a system providing an automated knowledge base is provided. The system includes a list of rules, a list of instructions, and a computer program product. Each rule in the list of rules comprises a Boolean expression and an associated warning statement. The Boolean expression tests whether a system configuration matches a configuration that results in a problem described by the associated warning statement. Each rule further comprises zero or more instruction references. Each instruction in the list of instructions includes an instruction statement. The instructions corresponding to the instruction references comprise a method for overcoming the problem. The computer program product identifies the system configuration of a particular system, evaluates the Boolean expression of each of the rules to determine whether the associated warning statement applies to the particular system, and compiles a warning list and plan using the list of rules, the list of instructions, and the instruction references.

It is to be understood that the foregoing general description and the following detailed description are exemplary and explanatory only, and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION

The present invention relates generally to what will be referred to herein as an automated knowledge base. It is particularly suited for aiding in the determination of the advisability of and process for upgrading and downgrading a particular software package on a particular computer system from one version to another. As used herein, the term "upgrade" refers to the replacement of an older software program with a newer software program. The term "downgrade" refers to replacing a newer version of a software program with an older one. Generally, the newer software program is identified by having a higher version number, although version numbers do not always follow this pattern. Furthermore, upgrading or downgrading could be from a software product of one vendor to a competing software product of another vendor. The term "current version" refers to the version of the program currently present on a particular computer, and the term "target version" refers to the version of the program to be installed on the computer.

Although particularly suited to software upgrades and downgrades, the system described herein may have application in other areas of technology, such as the replacement of equipment in any number of technology or industrial settings. Examples of such systems may include anything from computer equipment, networking equipment, factory equipment, industrial equipment, transportation equipment, and office equipment. It may also have applicability to replacing or upgrading equipment components or parts. In fact, the automated knowledge base may be useful in any environment where a person might contemplate replacing any system having complex dependencies and/or multi-step replacement procedures that are affected by these dependencies.

Figure 1:
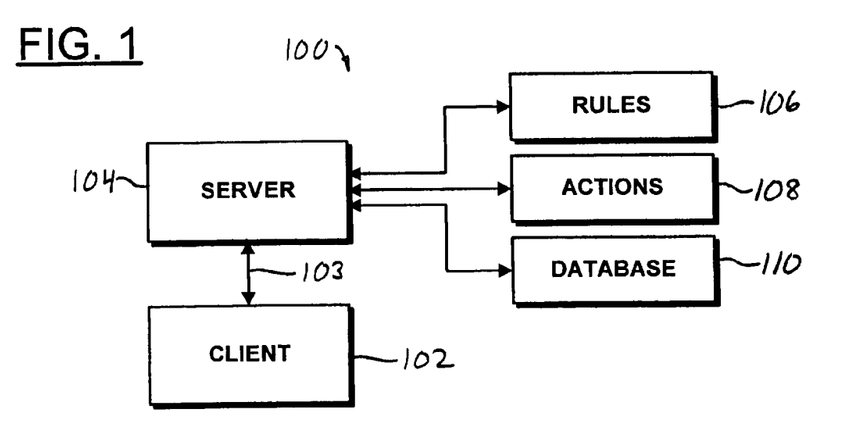
FIG. 1 presents an overview of an exemplary system providing an automated knowledge base.

FIG. 1 shows a hardware configuration of one embodiment of an automated knowledge base 100. Knowledge base 100 includes a server 104 connected through some communications link 103 to a client 102. Server 104 acts as an interface between client 102 and information stored in rules list 106, actions list 108, and database 110. Specifically, client 102 may generate a query as will be described in more detail below, and in response to the query, server 104 may access any of rules list 106, actions list 108, and database 110, retrieve necessary information to respond to the query, and send the information to client 102.

Server 104 may be a web server with some web application capability. A web application is a dynamic extension to a web server, allowing dynamic generation of Hyper-Text Markup Language (HTML) documents or other documents viewable in a web browser in response to browser input. For example, the web application could be a Common Gateway Interface (CGI), a Hypertext Preprocessor (PHP), Java servlets, Active Server Pages (ASP), or any other dynamic web content technology. In one embodiment, server 104 is CGI-enabled and runs Perl-language scripts which retrieve and format the data to be presented in HTML format to client 102. Where server 104 is a web server, client 102 may be a typical web browser for accessing and communicating with server 104.

In addition to using the web technology of web servers and web browsers (clients) other server/client technologies are contemplated. For example, the client could be a specialized software package optimized for the specific tasks of the automated knowledge base. In this case, the specialized software package can communicate the necessary information only, and the specialized software package would provide a user interface and format the information for viewing and/or printing. At the other end of the spectrum, the client could be a dumb terminal that receives only graphics or text information and does no local formatting of the information for viewing or printing, but instead displays images or text information as it is sent by the server. Therefore, it should be clear that the precise technology used for communication between the client and the server may vary depending upon the application, and details associated with such communications are generally well understood by those skilled in the art.

Client 102 and server 104 communicate over a communications link 103. Communications link 103 may be an Internet or intranet connection, a simple point-to-point connection, e.g., a dial-up connection, a local area network (LAN) connection, or any other means for communicating. Likewise, rules list 106, actions list 108, and database 110 may be located locally with server 104, client 102, or remotely from both client 102 and server 104.

Although the exemplary automated knowledge base 100 shown in FIG. 1 includes a client-server configuration, other configurations of the automated knowledge base are contemplated. For example, the automated knowledge base may simply be a computer program that is executed locally on a person's computer, with rules, actions, and database information stored locally or obtained from a remote location. If obtained from a remote location, it could access the information each time it is needed or it could periodically update a local copy of the information which is then accessed directly. Thus, the configuration of automated knowledge base 100 shown in FIG. 1 should be understood to be an exemplary configuration, and that many other suitable configurations are possible and will occur to those skilled in the art.

In one embodiment, rules list 106 and actions list 108 are simply plain text files. Exemplary formatting and contents of these files is described in further detail below with reference to Tables 1-5. However, it should be noted that rules list 106 and actions list 108 may be combined into a single file, spread among a plurality of files, or stored in a database for database retrieval.

Database 110 contains data on various systems. In one embodiment, the database is relational database maintained by a technical support organization to aid in diagnosis and resolution of problems being experienced by its customers. For example, each system running the software contemplated for upgrading or downgrading may periodically (or when a change occurs) inform database 110 of its configuration via an Internet or other network or point-to-point connection. As will be described in further detail later, it is possible to replace the database with various other systems for gathering similar information. For example, if the database stores information relating to a hardware configuration and/or installed software, this information could be provided by client 102. If client 102 is the system being upgraded, a diagnostic program could be executed by client 102 to automatically gather the necessary information. Alternatively, the information could be entered manually if it is not found in database 110. Many other suitable techniques for gathering and providing the necessary information will occur to those skilled in the art.

Figure 2:
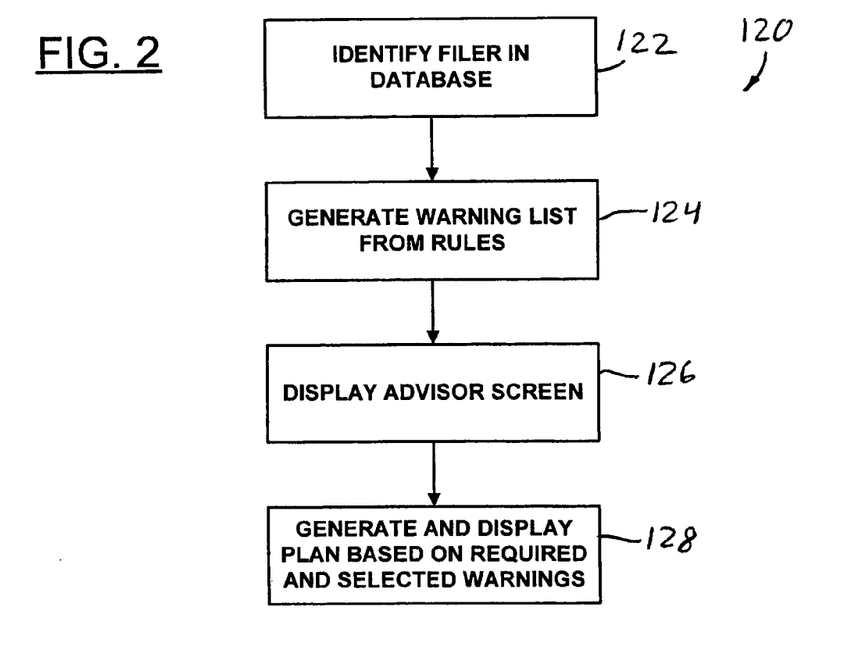
FIG. 2 shows a flowchart presenting an overview of an exemplary automated knowledge base procedure.

Referring to FIGS. 1 and 2, an overview of the operation of an automated knowledge base will now be described. The operation is described in the context of upgrading and downgrading a computer functioning as a storage system that provides access to data, herein referred to as a "filer." The filer can provide access to data in a variety of storage system architectures including, for example, a network attached storage (NAS) environment, a storage area network (SAN), and a disk assembly directly attached to a client. As noted above, however, the automated knowledge base may be applied to a broad range of computer systems and technologies. FIG. 2 shows a flowchart 120 that describes in general terms an exemplary operation for automated knowledge base 100. Initially, in step 122, client 102 generates a query, which includes a filer identifier and target version number. As mentioned, the filer may be client 102, or may be a different system. Server 104, upon receiving the filer identifier and target version number, searches database 108 with information pertaining to the specific filer identified by the filer identifier. The filer identifier may be, for example, a serial number or other unique code identifying a particular computer system that is being considered for upgrade.

Once data pertaining to the particular filer is obtained, the procedure outlined in flowchart 120 flows to operation 124 wherein rules list 106 (see FIG. 1) is read and a list of warnings is generated from the rules. The rules list, which will be described in more detail below with reference to Table 1, contains a series of conditionals and associated warnings. In one embodiment, each conditional is a Boolean expression. The rules list may be generated by hand in such a way that it is computer readable and parsable. Alternatively, the rules list may be generated with the assistance of specialized software to ensure conformance with a predetermined syntax and/or to aid in the converting of natural language rules into the conditional statements. The purpose of the rules is to provide a warning appropriate to the state of the particular filer and target version. For example, if a particular filer is running a particular processor not supported by the target version of the software, the rule would test for the condition that the unsupported processor is present, and if so, identify a warning appropriate to that condition.

Thus, in operation 124, the entire rules list is processed and a warning list containing appropriate warnings is generated. The procedure then flows to operation 126 wherein an advisor screen is presented to the user, with the advisor screen displaying each warning in the warning list compiled in operation 124. Depending on the particular warning, the user may have the option of deselecting or selecting specific warnings, which may or may not be relevant to the user's situation. Some warnings may be required and therefore cannot be deselected. Other warnings may be informational only and therefore cannot be selected. When the user is ready to proceed with the upgrade or downgrade, the user clicks on a link or presses a button or otherwise indicates to the software program that he or she is done reading and selecting warnings.

After the user is finished with the advisor screen in operation 126, the procedure flows to operation 128 wherein a plan is generated and displayed based on the selected warnings. Each warning has zero or more actions associated with it, and each action has an action name that identifies the particular action. Thus, the warning includes a list of actions using the action name that may be taken to mitigate or overcome the circumstances giving rise to the warning. For example, if the filer has an accessory card not supported by the target version, one of the actions might be to remove the card. The selected and required warnings are identified by server 104, which then retrieves actions from actions list 108 associated with the selected warnings and organizes the actions into a plan as will be described in more detail later.

Figure 3A:
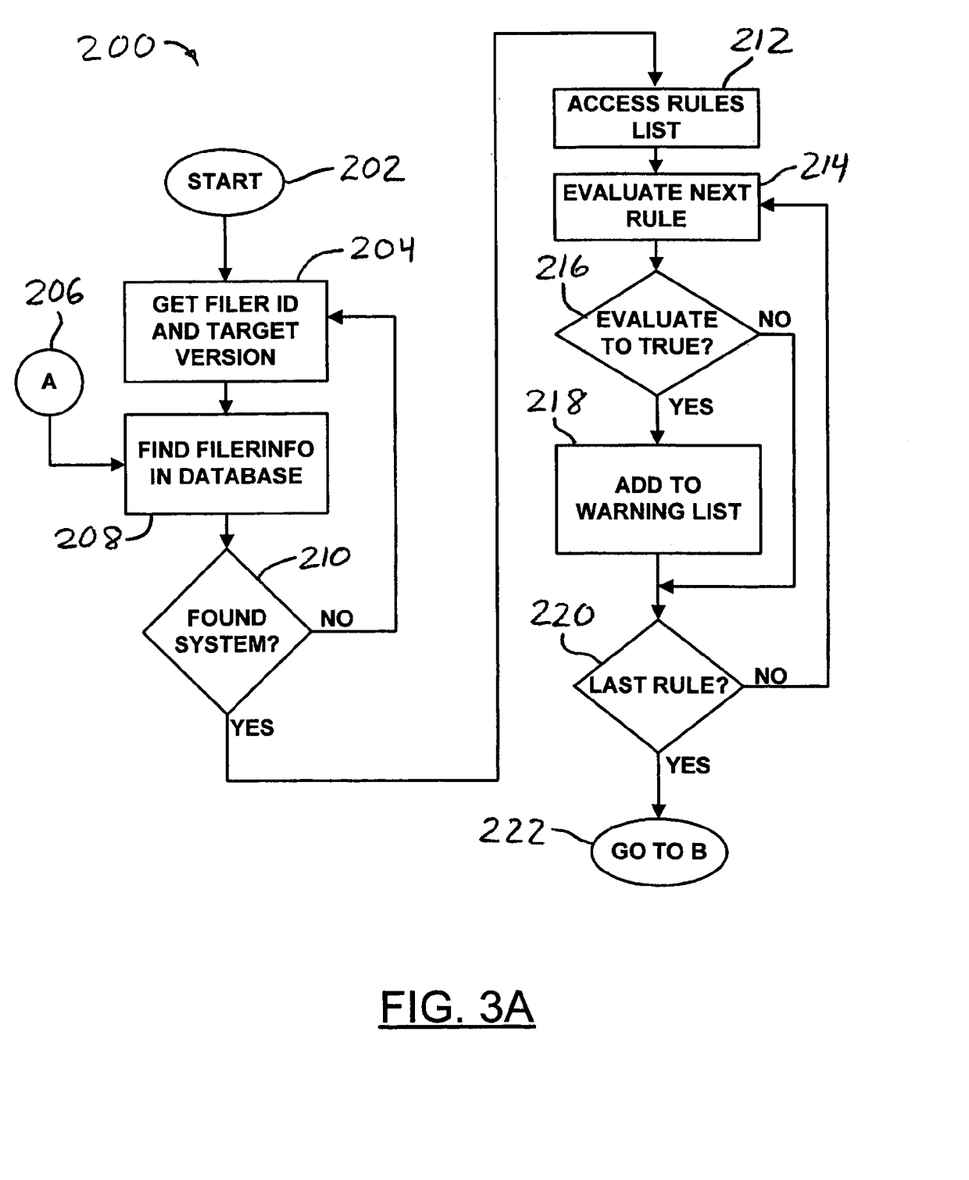
FIGS. 3A, 3B, and 3C together show a flowchart describing an exemplary automated knowledge base procedure.
Figure 3B:
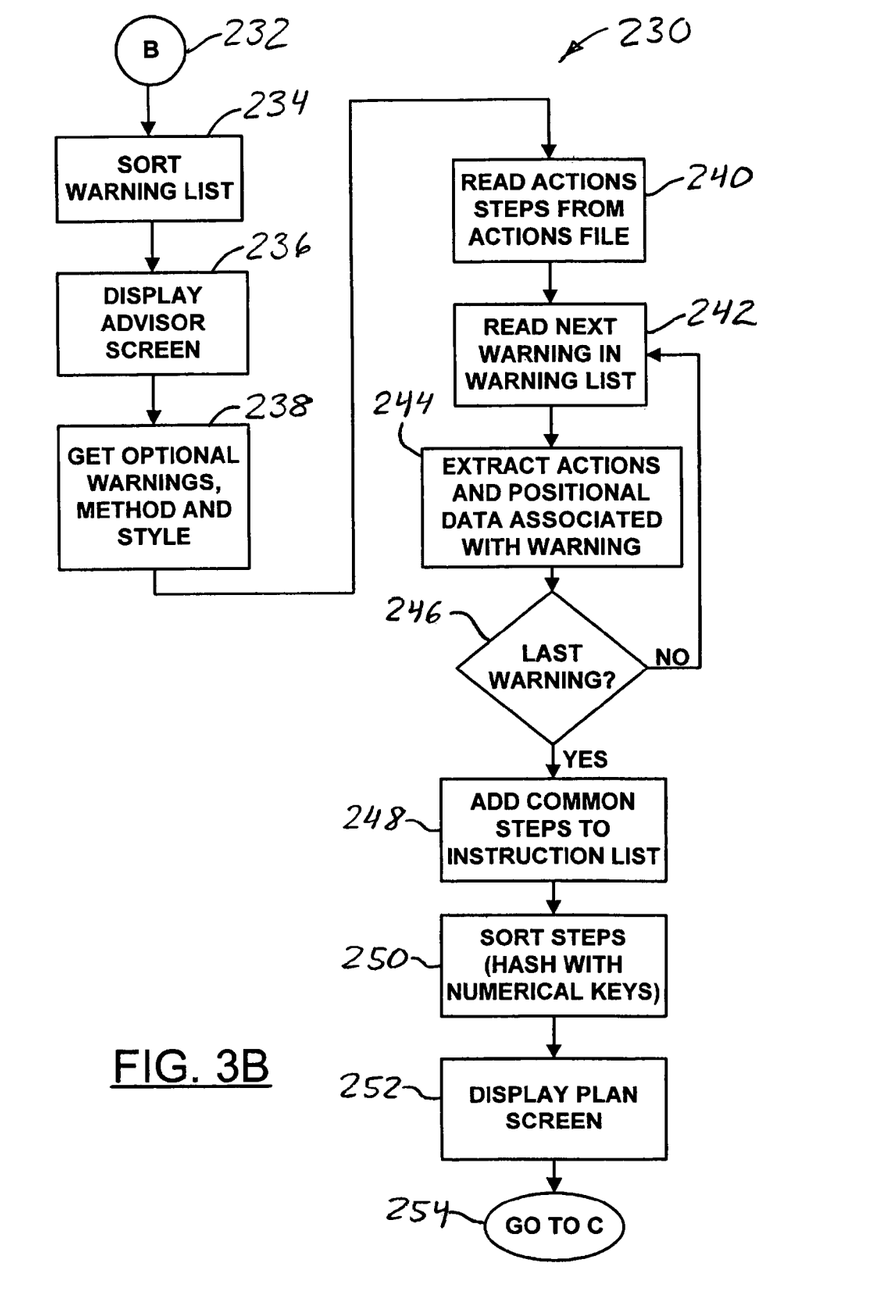
Figure 3C:
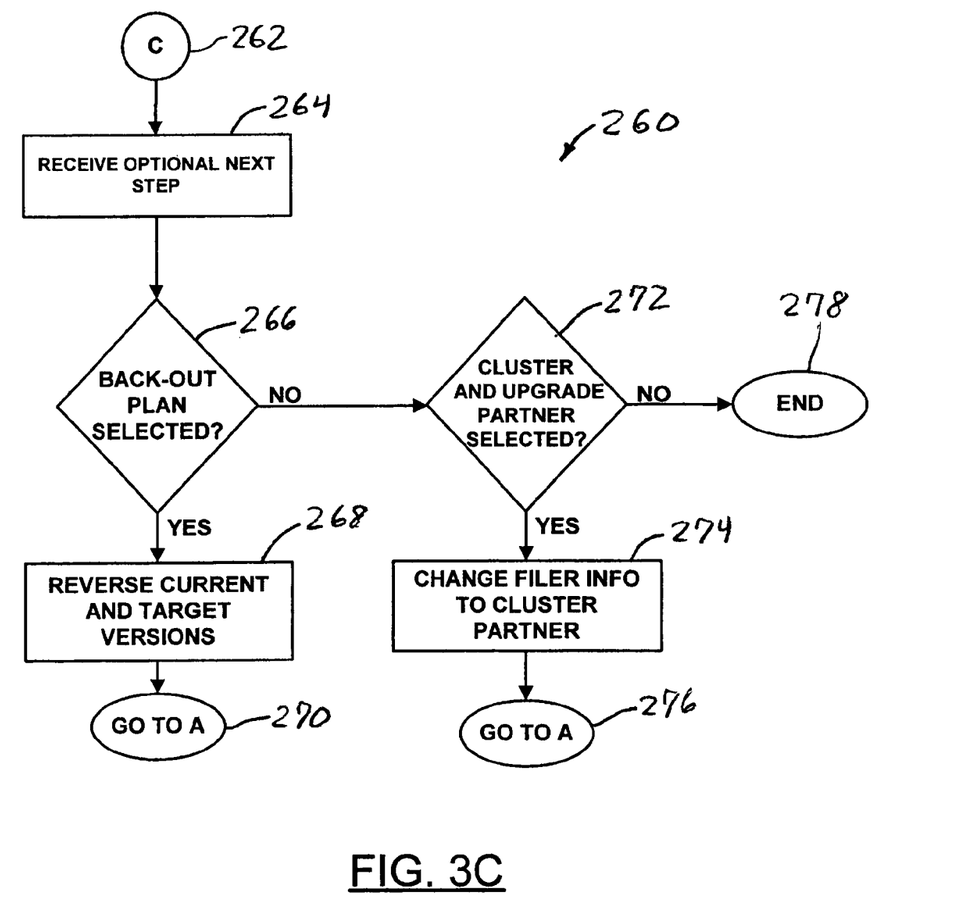

FIGS. 3A, 3B, and 3C show a more detailed flowchart depicting an exemplary procedure for one embodiment of an automated knowledge base system. Flowchart 200 in FIG. 3A represents the procedure up to the generation of a warning list. The procedure begins as indicated with starting block 202 and proceeds to operation 204 wherein the filer identifier and target version is identified. In one embodiment, the filer identifier and target version information is transmitted from client 102 to server 104 (see FIG. 1) as data entered by a user. The data may be entered into a text box or selected from a list in any manner well understood by those skilled in the art, and then transmitted to server 104, which accepts this information as a query.

Flowchart 200 then proceeds to operation 208 wherein the filer identifier is matched with configuration information pertaining to the filer in database 110 (see FIG. 1). As mentioned previously, the term "filer" refers to a computer functioning as a storage system that provides access to data. However, it should also be kept in mind that the automated knowledge base system herein described may be implemented for any type of system or equipment being upgraded or replaced.

The database will either contain information pertaining to the filer identifier or not, as indicated by operation 210. If the information is not found, then the procedure returns to operation 204 so that a valid filer identifier can be entered. On the other hand, if the information is present in database 110 (see FIG. 1) the procedure flows to operation 212 wherein the rules list 106 is accessed. Then, at operation 214, the next rule is retrieved and evaluated.

Each rule in rule list 106 (see FIG. 1) comprises a conditional statement in the form of a Boolean expression and a warning name. Table 1 shows an exemplary rules list. Each rule includes a conditional statement followed by the name of a warning. The conditional statement tests whether the filer has a certain condition which would then trigger the warning. For example, the first conditional tests whether the motherboard firmware version is "4.2.2", tests whether the microprocessor is an Intel microprocessor, identifies the method of firmware update ("cf head" referring to a flash memory card), and the motherboard type (xfiler).

TABLE 1

```
# Check for 6.5 minimum FW
if mb_fw_lt("4.2.2") && is_intel( ) && cf_head( ) &&
is_xfiler( ) && !head_model ("F87") &&
os_ge(TARGET_ONTAP, "6.5") : warn
"up.req.mb.cf.intel.xfiler.fw.low";
if mb_fw_lt("4.2.2") && is_intel( ) && cf_head( ) &&
!is_xfiler( ) && !head_model ("F87") &&
os_ge(TARGET_ONTAP, "6.5") : warn
"up.req.mb.cf.intel.rodan.fw.low";
```

Referring back to FIG. 3A, the procedure evaluates the next rule in operation 214 and then flows to operation 216 wherein it is determined whether the rule's conditional evaluated to true. If so, the operation proceeds to operation 218 wherein the warning name associated with the rule is added to a warning list. As shown in Table 1, the warning name is a series of tags separated by periods in a manner similar to the well-known structure of Internet domain names. Each tag has a specific meaning and aids in later sorting the warnings in a meaningful manner. For example, in the warning name "up.req.mb.cf.intel.xfiler.fw.low," the first tag "up" indicates that the warning is for upgrades. The first tag can be either "up" for an upgrade or "rev" for a reversion (downgrade). This is illustrated in Table 2.

TABLE 2

| 1st tag | |
|---|---|
| Tag | Meaning |
| up | Upgrade |
| rev | Revert or Downgrade |

As shown in Table 3, the second tag can be either "req," "rec," "info," or "bad-target." After the first two tags, all the remaining tags are merely subcategories of issues and warnings. For example, for the warning name "up.req.mb.cf.intel.xfiler.fw.low," the third tag "mb" indicates the warning relates to the motherboard. The fourth, "cf" relates to the firmware update method, in this case using a flash memory card. The fifth and sixth tags identify the issue as relating to the Intel processor, and the xfiler motherboard type, respectively. The sixth tag identifies an issue with the firmware, and the seventh tag "low" indicates that the firmware version number is too low. Thus, the warning name provides a hierarchical identifier of a specific warning and allows an organized and coherent approach to managing the various potential issues.

TABLE 3

| 2nd tag | |
|---|---|
| Tag | Meaning |
| req | Required; user cannot deselect |
| rec | Recommended; selected by default; user can deselect |
| info | This warning is for information only; cannot be selected |
| bad_target | Required; user cannot deselect. Higher priority than "req" |

Returning to FIG. 3A, if the rule evaluated at operation 216 is not true, then the procedure skips to operation 220 wherein it is determined if there are any more rules in the rules list. If so, then the procedure returns to operation 214 wherein the next rule is evaluated. If not, then the procedure jumps to continuation block 232 in FIG. 3B, as indicated by jump block 222.

After all the rules in the rules list are processed as shown in flowchart 200, the procedure continues at operation 234 in FIG. 3B wherein the warning list is sorted. The warning list is sorted so that all "bad_target" warnings (see Table 3) are listed first, then the required warnings identified with the "req" tag, then the recommended warnings identified with the "rec" tag, then the informational warnings identified with the "info" tag. In this manner, the most serious warnings are displayed first, i.e., at the top of the list. Within each of these categories, the warnings may be sorted in other ways, for example, alphabetically, so that similar items are grouped together as much as possible. This is made possible by the hierarchical structure of the warning names.

Each warning name is unique and identifies a particular warning in a warning definition list. In one embodiment, the warning definition list forms a section of the file containing the rules list. Table 4 shows exemplary warning definitions for the rules listed in Table 1.

TABLE 4

```
up.req.mb.cf.intel.xfiler.fw.low:1:10:up.mb.fw.intel.cf:1:12:up.std.
download_serv:1:13:up.halt:1:15:up.bye:1:16:up.boot.stop:1:18:up.
update_flash:1:19:up.bye "The firmware on the motherboard is <b>
$CUR_MB_FW </b> and is not up to date. The latest firmware for this
platform is $LATEST_XFILER_FW. <b>Upgrading this firmware is
required before upgrading ONTAP</b>"
up.req.mb.cf.intel.rodan.fw.low:1:10:up.mb.fw.intel.cf:1:12:up.std.
download_serv:1:13:up.halt:1:15:up.bye:1:16:up.boot.stop:1:18:up.
update_flash:1:19:up.bye "The firmware on the motherboard is <b>
$CUR_MB_FW </b> and is not up to date. The latest firmware for this
platform is $LATEST_RODAN_FW. <b>Upgrading this firmware is
required before upgrading ONTAP</b>"
```

In one embodiment exemplified by Table 4, each warning definition includes the warning name, zero or more action names, each preceded by two numbers separated by colons, and an narrative explanation of the warning. The action names each identify an action to take to overcome the circumstances giving rise to the warning. In one embodiment, the action names are hierarchical in nature in a manner similar to that described above with reference to the warning names. The two numbers preceding each action name are referred to as positional data and are used in organizing the plan as will be described later. The narrative explanation can include variables such as $CUR_MB_FW, which is recognized by server 104 as a reference to, for example, the current firmware version installed on the filer's motherboard. This information is retrieved from database 110 (see FIG. 1) and inserted as appropriate. In one embodiment, the narrative explanation also may include HTML tags such as <b> and </b>, which denotes bold text.

Figure 4:
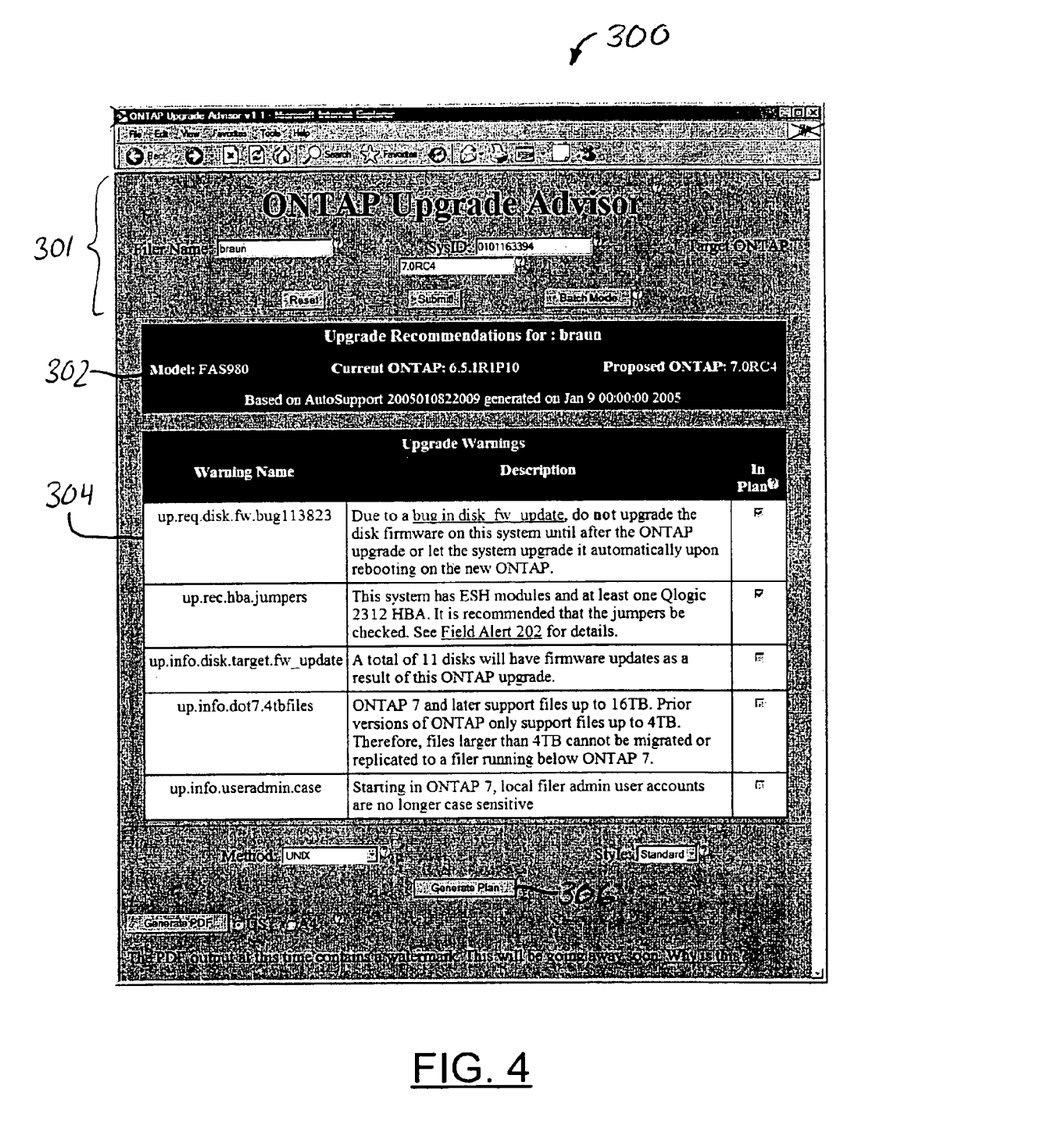
FIG. 4 shows an exemplary upgrade advisor screen.

After the warnings are sorted, the procedure flows to operation 236 wherein an advisor screen is displayed for the user. The advisor screen is first created by generating a document internally, which is a representation of the information to be displayed. The document may comprise an HTML document or other electronic representation. In one embodiment, after the document is generated, it is transmitted to the client 102 (see FIG. 1) so that it may be displayed for the user as an advisor screen. FIG. 4 shows an exemplary advisor screen 300. Advisor screen 300 includes four (4) sections of data. The first section 301 includes a heading with the phrase "ONTAP Upgrade Advisor" that indicates that this is an advisor screen. The term "ONTAP" refers to an operating system called DATA ONTAP®, which is a registered trademark of Network Appliance, Inc. First section 301 also indicates the filer identifier, i.e., 0101163394, and the target version, 7.0RC4. These fields can be changed and resubmitted to the automated knowledge base as a new query. The field "Filer Name" may be required as a security measure. Each filer identifier is associated with a name, e.g., of the person or organization responsible for the filer. By requiring that both the filer identifier and correct name be submitted, the user can be reasonably certain that the correct information is retrieved.

Section 302 identifies the model of the filer and the current version and target version of the operating system. Furthermore, the AutoSupport data, which is the data retrieved from database 110 (see FIG. 1) relating to the filer configuration, is dated to ensure that no changes have been made to the system since the data was collected.

Section 304 contains a displayed warning list comprising a table having three columns. The left column provides the name of the warning, the middle column provides the written description of the warning, and the right column provides a checkbox for selecting or deselecting recommended warnings, as will be further described later. Each row of the table provides a warning from the warning list. Those skilled in the art will appreciate that, although this example shows three columns, the configuration may be altered to any suitable configuration. For example, the warning name can be hidden and/or the check box provided prior to the first word of the description. Note that the first warning shown in section 304 is required, and so the associated check box is checked and shaded, indicating that it is disabled and cannot be deselected. The second warning is a recommended warning and checked by default; the user can deselect this if he or she decides the warning does not apply. The remaining warnings are informational only and are deselected and disabled. At this point, optional upgrade methods can be selected as well. At the bottom of exemplary advisor screen 300 there is a method selector and a style selector, each in the form of a drop-down list. The method selector allows the user to select different methods for installing the new software. In one embodiment, the user can choose between loading the software via a UNIX host, a Microsoft Windows host, hypertext transfer protocol (HTTP), or by a support console. Additionally, the user can select between a non-disruptive or standard style upgrade.

Also at the bottom of exemplary advisor screen is a generate plan button 306. After the user has read the warnings and decides to proceed with the upgrade, this button is selected and the check box data, i.e., data describing which check boxes are selected or deselected, is sent to server 104 (see FIG. 1), which receives it as a query.

Returning now to FIG. 3B, after the advisor screen is displayed in operation 236, the procedure flows to operation 238 wherein recommended warnings and additional selections are received by server 104 (see FIG. 1). At this point, the phrase "warning list" will refer to the warnings listed in the advisor screen that are selected or checked at the time the user selects the generate plan button indicating a desire to proceed with the upgrade.

The procedure flows to operation 240 wherein the actions list 108 (see FIG. 1) is read. Each action name provided in conjunction with the warnings refers to an action in actions list 108. Table 5 shows an exemplary actions list. Each action includes the action name followed by an instruction to be presented to the user. As with the warning description discussed above, the instruction can include formatting codes, e.g., HTML tags and/or variable names.

TABLE 5 up.mb.fw.intel.cf
"Load the motherboard firmware files onto the filer. Refer to the <a href='http://now.netapp.com/NOW/download/tools/servimage/archive_ofw.shtml'>NOW site</a> for detailed instructions."
up.halt
"Halt the filer.<br> $FILER] halt"
up.bye
"Restart the filer<br> $FW_PROMPT bye"

Flowchart 230 continues next with operation 242 wherein the next warning from the warning list is read. The warning list now comprises only those required warnings and selected warnings listed in the advisory page. Each warning has zero or more action names listed after the warning. At next operation 244, the action names are extracted from the warning read in operation 242 along with the positional data for each action. As mentioned above with respect to Table 4, in one embodiment, the warning includes two numbers (positional data) along with the action name identifying a desired relative position of the instruction when presented along with other instructions. When organized in accordance with the positional data, the compiled instructions result in a coherent plan.

In one embodiment, the plan is divided into five (5) sections. A first section of the plan includes all instructions that precede an initial common step of downloading the new version from a particular Internet location, e.g., an HTTP or file transfer protocol (FTP) address. The second section of the plan includes all instructions that follow the initial common step but precede a second common step of loading the new version onto the filer. The third section of the plan includes all instructions that follow the second common step but precede the third common step of executing a "download" command. The fourth section of the plan includes all instructions that follow the third common step but precede a fourth common step of rebooting the filer. Finally, the fifth section of the plan includes all instructions that follow the reboot step.

The first number in the pair of numbers that comprise the positional data for each instruction corresponds with one of the five sections of the plan. In one embodiment, the sections are numbered 0 to 4. Thus, a number "1" indicates that the instruction will appear in the second section of the plan, after the first common step of downloading the new version. The second number is an arbitrary relative position of the instruction and, in one embodiment, ranges from 0 to 99. Generally, positional data is selected such that no two actions are given the same relative position in a plan, which may result in one action overwriting another.

Returning to flowchart 230 shown in FIG. 3B, the next operation is 246, in which the warnings list is checked to see if the last warning has been read. If not, then the procedure returns to operation 242 to read and process the next warning in the list. However, if the last warning has been read, then the procedure flows to operation 248 wherein any common steps, which do not depend from warnings, are added to the warning list. Common instructions may internally be given a positional number such as 1:0, 2:0, etc., so that each common step is properly positioned in the following sort operation.

Figure 5:
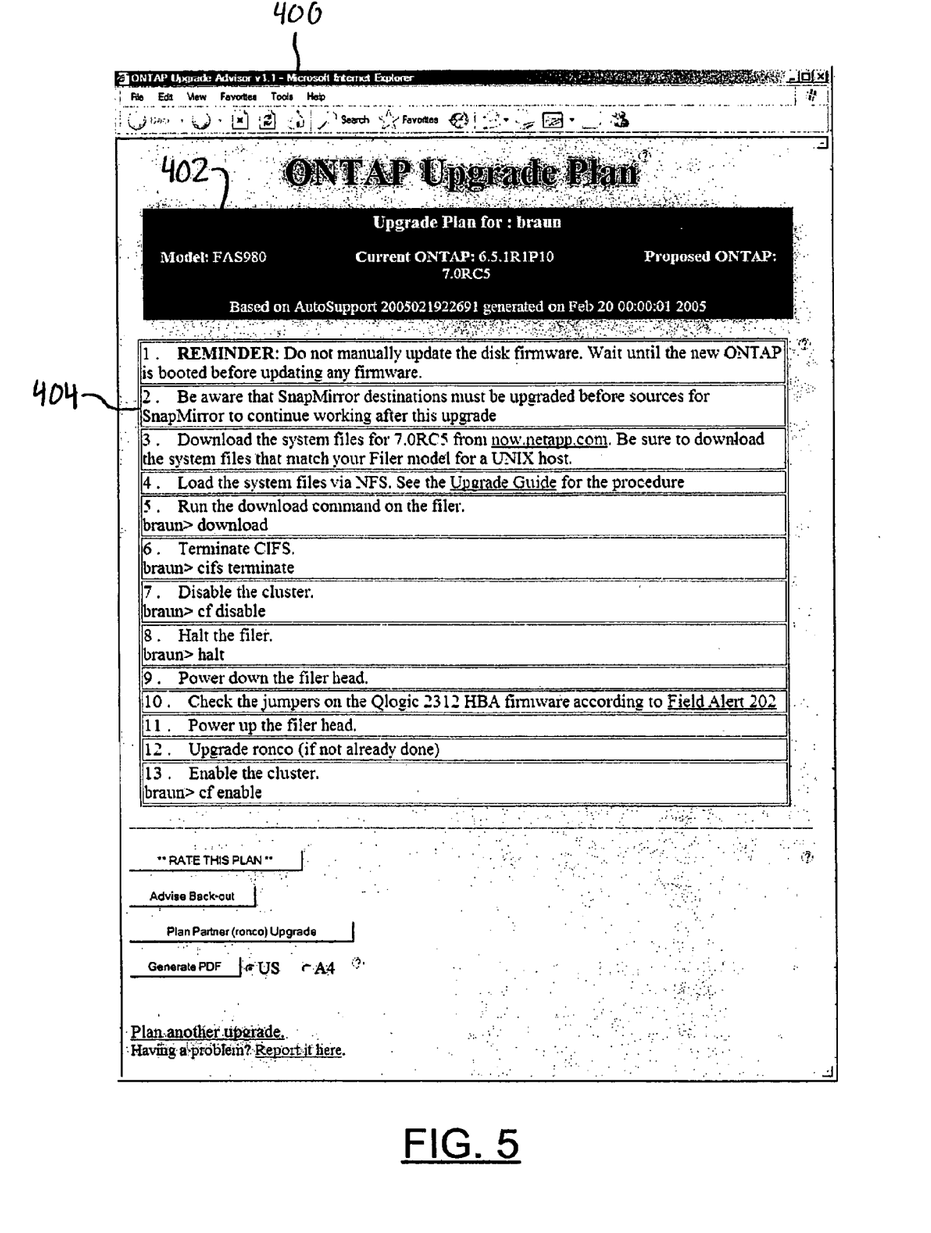
FIG. 5 shows an exemplary upgrade plan screen

At operation 250, the instructions are sorted into a plan according to the positional data mentioned above. Finally, at operation 252, the plan screen is displayed. FIG. 5 presents an exemplary plan screen based on the exemplary advisor screen shown in FIG. 4. Section 402 shows a heading similar to section 302 described above with reference to FIG. 4. Section 404 provides an ordered list of instructions that makes up the plan. After the plan screen is displayed in operation 252, the procedure jumps to continuation block 262 in FIG. 3C as indicated by jump block 254.

FIG. 3C shows a flowchart 260 illustrating exemplary optional steps to be taken after the plan screen is displayed. Continuation block 262 indicates continuation from jump block 254 of FIG. 3B. The procedure flows to operation 264 wherein an optional next step is received. As shown in the exemplary advisor screen 400 (see FIG. 5), various links and/or buttons are provided at the bottom of the plan screen 400 for the purpose of performing an optional next step. The procedure outlined in flowchart 260 then proceeds to operation 266 wherein it is determined whether a back-out plan has been selected. A back-out plan comprises a plan for reversing the upgrade or downgrade, in case an unforeseen problem arises with an upgrade or downgrade. The back-out plan can be selected, for example, by clicking the "Advise Back-out" button at the bottom of plan screen 400.

If the back-out plan is selected, then the current version and target version variables are reversed at operation 268 and, as shown by jump block 270, the procedure jumps to operation 206 in FIG. 3A.

If the back-out plan is not selected at operation 266, then the procedure flows to operation 272 wherein it is determined whether a cluster partner upgrade is selected. When two or more filers are clustered together, they need to be upgraded at the same time so that they work together properly. A cluster is a group of filers connected locally together that act as a single unit. Clicking on the "Plan Partner (ronco) Upgrade" button at the bottom of plan screen 400 (FIG. 5) provides a shortcut to entering in the filer identifier and other information manually. If the cluster and upgrade partner is selected in operation 272, then the procedure flows to operation 274 wherein the filer info is changed to the next cluster partner. The procedure then jumps to continuation block 206 in FIG. 3A as shown by jump block 276. If, at operation 272, the cluster and upgrade partner is not selected, then the procedure ends as indicated by end block 278.

Those skilled in the art will recognize that variations and modifications are possible. For example, at the bottom of advisor screen 300 and plan screen 400 (FIGS. 4 and 5, respectively) there is a "Generate PDF" button. This button may be provided to provide a formal document with logo graphics or other formatting options for printing. In a technical support environment, this would provide a document that could then be emailed to the customer who would then have a professional looking advise and upgrade plan tailored to the customer's system.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing an automated knowledge base, the method comprising:

receiving a system identifier and a target version, the system identifier identifying a particular computer system, wherein the computer system is a filer that provides access to stored data, and includes a first filer and a second filer connected locally to act as a single filer cluster, the target version identifying a target computer program to be installed on the computer system;

retrieving configuration information of the particular computer system using the system identifier, wherein the configuration information includes a corresponding first configuration of the first filer and a corresponding second configuration of the second filer, wherein the first configuration and the second configuration are different, wherein at least a first portion of the computer program is to be installed on the first filer and a second portion of the computer program is to be installed on the second filer substantially simultaneously so as to continue acting together as a single filer cluster;

accessing a rules list comprising a series of Boolean expressions and corresponding warning statements; and identifying at least one warning statement of the corresponding warning statements, the at least one warning statement describing a conflict between the target computer program and at least one of the first configuration and the second configuration, the identifying the at least one warning statement comprising evaluating one Boolean expression of the series of Boolean expressions, the one Boolean expression corresponding to the at least one warning statement, the evaluation of the Boolean expression identifying that the conflict between the target computer program and at least one of the first configuration and the second configuration exists; and generating a warning document comprising the at least one warning statement.

2. The method of claim 1 wherein the target computer program comprises a computer operating system.

3. The method of claim 1 wherein the retrieving configuration information comprises accessing a database containing the configuration information.

4. The method of claim 1 wherein the warning statement is one of a plurality of identified warning statements, the generating a warning document comprising sorting the identified warning statements in order of importance so that most serious ones of the identified warning statements are listed first.

5. The method of claim 1 wherein each Boolean expression compares the configuration information with configurations known to cause a problem described by the corresponding warning statement.

6. The method of claim 1, further comprising, identifying zero or more instruction statements for each identified warning statement and generating a plan based on the instruction statements.

7. The method of claim 6 wherein the plan includes additional common instruction statements inserted into the plan, the common instruction statements describing necessary action in an absence of any identified warning statements.

8. The method of claim 6 wherein each identified warning statement includes a list of zero or more instruction names and positional data for each of the instruction statements, the generating a plan comprising ordering instruction statements corresponding to the instruction names in accordance with the positional data.

9. A method for providing an automated knowledge base, the method comprising:

retrieving information that identifies a configuration of a system from a database, the system having a current version of a component that is potentially upgradeable or downgradeable to a target version of the component, wherein the system includes a first system and a second system connected to act as a single system, wherein the first system has a corresponding first configuration and the second system has a corresponding second configuration, wherein the first configuration and the second configuration are different, wherein at least a first portion of a computer program is to be installed on the first system and a second portion of the computer program is to be installed on the second system substantially simultaneously so as to continue acting together as a single system;

parsing a list of rules, the list of rules comprising a series of Boolean expressions and corresponding warning statements, each of the Boolean expressions testing for and identifying a condition of at least one of the first configuration and the second configuration;

generating a warning list, the warning list containing each of the warning statements corresponding to each of the conditions identified the Boolean expressions, the warnings describing the conditions that may affect the upgrading or downgrading and explaining how the upgrading and downgrading is affected by the conditions;

generating an advisor document containing the warning list; and generating a plan document containing a plan based on at least one of the warning statements in the warning list.

10. The method of claim 9 wherein the system comprises a computer and the component comprises an operating system.

11. The method of claim 9 wherein the advisor document and plan document are HTML formatted documents in electronic format for transmitting to a web client which displays an advisor screen and plan based on the HTML formatted documents.

12. A method for providing an automated knowledge base, the method comprising:

identifying a current version and a target version for a system to be replaced;

retrieving configuration information pertaining to the system, wherein the system includes a first system and a second system connected to act as a single system, wherein the first system has a corresponding first configuration and the second system has a corresponding second configuration, wherein the first configuration and the second configuration are different, wherein at least a first portion of a computer program is to be installed on the first system and a second portion of the computer program is to be installed on the second system substantially simultaneously so as to continue acting together as a single system;

retrieving a list of rules, each rule in the list of rules comprising a Boolean expression, the Boolean expression testing for a condition of the system using the configuration information;

evaluating each Boolean expression of each of the rules in the list of rules;

for each of the rules, adding a warning to an advisor document when the condition tested by the Boolean expression is present, the warning corresponding to the rule, each warning being added being an added warning, the advisor document thereby providing advice regarding the replacing of the current version with the target version when the corresponding condition is present, for each of the first configuration and the second configuration.

13. The method of claim 12 wherein the configuration information is retrieved from a database containing configuration information of a plurality of systems.

14. The method of claim 12 wherein each of the warnings has a unique warning name, and each of the rules includes the warning name of the warning associated with the corresponding one of the rules.

15. The method of claim 14 wherein each of the warnings has a tag that identifies a relative seriousness of the warning, the method further comprising sorting the added warnings so that most serious ones of the warnings appear first in the advisor document containing the added warnings.

16. The method of claim 12 wherein the system comprises a computer system and the configuration information includes information on a hardware configuration of the computer system.

17. The method of claim 12 further comprising:
receiving an action list, each action in the action list comprising an instruction;
identifying ones of the instructions relevant to at least one of the displayed warnings, the instructions being identified as being relevant being referred to as relevant instructions;
identifying a desired relative position of each of the relevant instructions with respect to any other of the relevant instructions;
organizing the relevant instructions into a plan in accordance with the desired relative positions; and
generating a document containing the plan.

18. The method of claim 17 wherein each one of the warnings is identified as one of a required warning, a recommended warning, or an informational warning, the method further comprising:
for each recommended warning added to the advisor document, allowing a user to select or deselect the recommended warning after the displaying of the warnings; and
wherein the ones of the instructions comprise instructions associated with the required warnings and selected ones of the recommended warnings added to the advisor document.

19. The method of claim 17 wherein each instruction in the list of instructions has a unique instruction name, each of the warnings includes a list of zero or more instruction names, wherein the ones of the instructions relevant to at least one of the added warnings are identified by having corresponding ones of the instruction names listed by the added warnings.

20. The method of claim 19 wherein each warning further includes positional data with each instruction name in the list of zero or more instruction names, the identifying the desired relative position comprising reading the positional data.

21. The method of claim 19 further comprising adding common instructions into the plan, the common instructions being instructions to be carried out regardless of the configuration information.

22. A computer readable media having program instructions for implementing an automated knowledge base, the computer readable media comprising:
program instructions for retrieving a system identifier and a target version identifier;
program instructions for retrieving configuration information pertaining to a system, wherein the configuration information includes a corresponding first configuration of a first system and a corresponding second configuration of a second system, wherein the first configuration and the second configuration are different, wherein at least a first portion of a computer program is to be installed on the first system and a second portion of the computer program is to be installed on the second system substantially simultaneously so as to continue acting together as a single system;
program instructions for retrieving a list, the list containing a plurality of rules, each of the rules comprising a Boolean expression that tests for a condition of the first system and the second system using the corresponding first configuration and second configuration and an associated warning;
program instructions for evaluating the Boolean expression for each of the rules to determine whether the condition tested by the Boolean expression is present in the system;
program instructions for adding to a list of warnings to be displayed each of the associated warnings that are associated with each of the rules for which the condition is determined to be present for each one of the first system and second system; and
program instructions for generating and displaying a document containing the list of warnings.

23. The computer program product of claim 22 wherein each of the warnings has a unique warning name and each of the rules includes the warning name of the warning associated with the corresponding one of the rules, each warning name comprises a series of tags wherein one of the tags identifies a relative seriousness of the warning, the machine readable media further comprising program instructions for sorting the list of warnings so that most serious ones of the warnings appear first in the list of warnings to be displayed.

24. The computer program product of claim 22 wherein the machine readable media further comprises:
program instructions for receiving a list containing a plurality of actions, each of the actions comprising an instruction statement;
program instructions for identifying ones of the instruction statements relevant to at least one of the displayed warnings, the instruction statements being identified as being relevant being referred to as relevant instructions;
program instructions for identifying a desired relative position of each of the relevant instructions with respect to any other of the relevant instructions;
program instructions for organizing the relevant instructions into a plan in accordance with the desired relative position of each of the relevant instructions; and
program instructions for generating a document containing the plan.

25. The computer program product of claim 24 wherein each of the warnings is identified as one of a required warning, a recommended warning, or an informational warning, the machine readable media comprising program instructions for, for each recommended warning, allowing a user to select or deselect the warning after the warnings are displayed, wherein the ones of the instructions comprise instructions associated with the required warnings and selected ones of the recommended warnings.

26. The computer program product of claim 24 wherein each instruction in the list of instructions has a unique instruction name, each of the warnings includes a list of zero or more instruction names, wherein the ones of the instructions relevant to at least one of the displayed warnings are identified by identifying instructions having instruction names listed by the displayed warnings.

27. The computer program product of claim 26 wherein each warning further includes positional data with each instruction name in the list of zero or more instruction names, wherein the relative position is identified by reading the positional data.

28. The computer program product of claim 24 wherein the machine readable instructions further cause the computer to insert common instructions into the plan, the common instructions being instructions to be carried out even absent any warnings when replacing the current version with the target version.

* * * * *